Patented Jan. 2, 1934

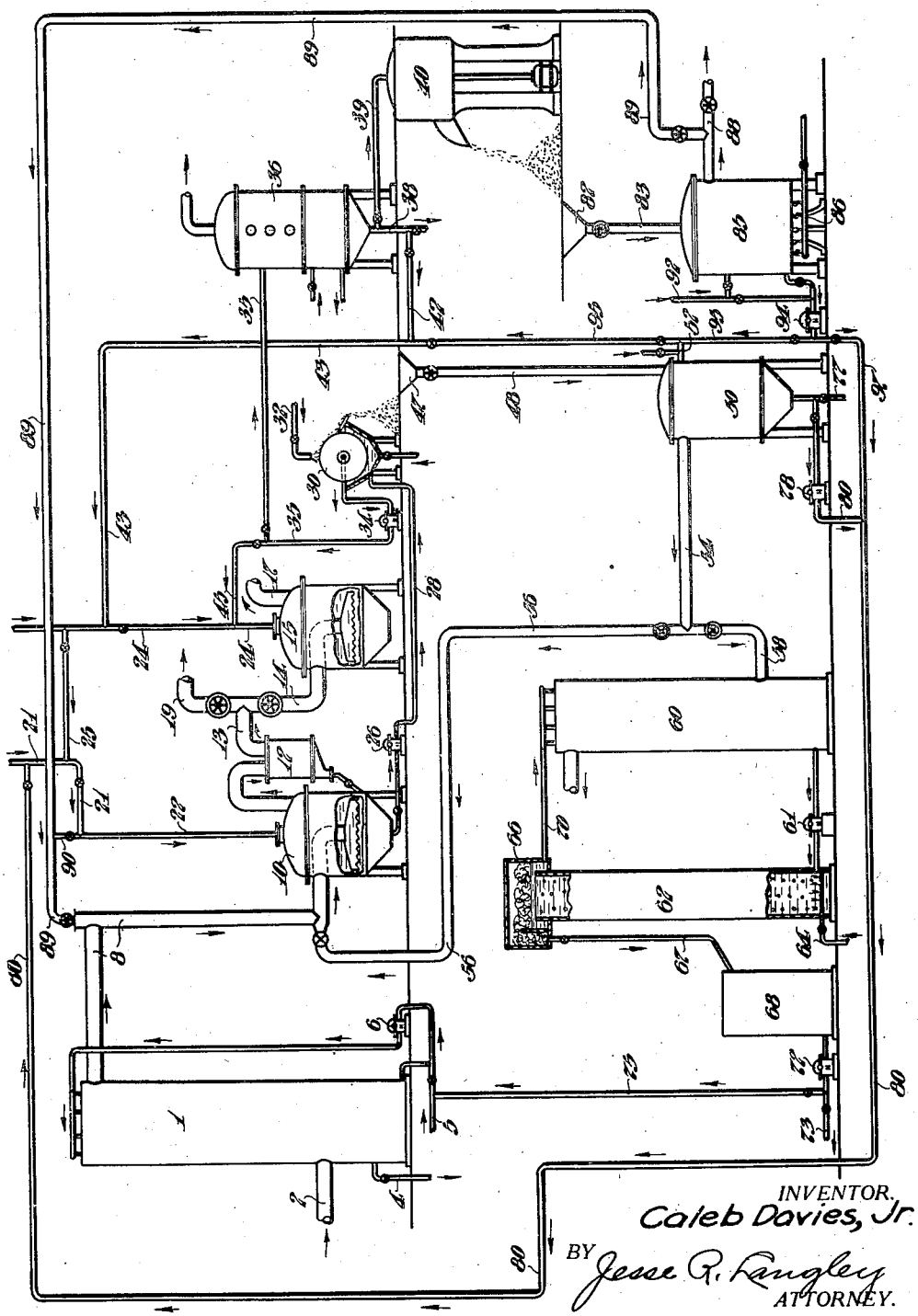

1,942,050

UNITED STATES PATENT OFFICE 1,942,050

GAS PURIFICATION

Caleb Davies, Jr., Pittsburgh, Pa., assignor to The Koppers Company of Delaware, a corporation of Delaware Application May 7, 1931. Serial No. 535,637

3 Claims. (Cl. 23—3)

This invention relates to the purification of fuel gases such as coke oven gas and the like from ammonia and other undesirable constituents such as hydrogen sulphide and cyanogen compounds. It relates especially to the employment of spent pickling liquor or analogous solutions of iron salts in the purification of such gases.

An object of my present invention is to provide an improved process of purifying fuel gas from undesirable impurities.

A second object of my invention is to provide a process wherein spent pickling liquor or the like is utilized in the removal of ammonia and hydrogen sulphide from fuel gas and suitable apparatus therefor.

Another object of my invention is to provide a process wherein pickling liquor or the like is combined with constituents of fuel gas to produce ammonium salts and useful iron compounds substantially free from impurities.

My invention has for further objects such other operative advantages and results as are found to obtain in the process hereinafter described and claimed.

The pickling liquor ordinarily used in cleaning iron and steel sheets, tubes, castings and the like and in preparing such objects for tinning or galvanizing consists of a relatively weak solution of $H_2SO_4$ or some other suitable acid. When this liquor becomes too nearly saturated with salts or too dirty to be suitable for further use, it is withdrawn and replaced with fresh solution. The spent or waste pickling liquor generally contains iron salts such as ferrous sulphate, amounting to 25 or 30% by weight, and free acid such as $H_2SO_4$ amounting to about 1%.

In the past, several attempts have been made to utilize spent pickling liquor or other solutions of iron salts in recovering ammonia from fuel gases or from the gas liquor condensed therefrom, such as the processes described in the copending applications of F. W. Sperr, Jr., Serial No. 541,992, filed June 4, 1931 (Case No. 475) and Serial No. 541,993, filed June 4, 1931 (Case No. 476), and elsewhere. However, various characteristics of these processes have limited their application.

Among these more or less troublesome features are the necessity of using substantially pure ammonia vapor, the formation of ferrocyanides which contaminate the final products, solubility of ferrous compounds such as ferrous hydroxide which increases the ammonia vapor pressure of the solutions of iron and ammonium salts and leads to losses of ammonia, and the corrosive action of solutions of ferric compounds which have sometimes been prepared by oxidizing the ferrous compounds to avoid the previously mentioned difficulty and to obtain more complete removal of iron from the solutions.

My present invention means for overcoming these difficulties. Ferrocyanide formation is overcome by preliminary removal of cyanogen compounds, including HCN, from the gas, and the other difficulties are overcome by precipitating the iron as ferrous sulphide.

A further advantage of my present process lies in the fact that it is possible, by slightly modifying the operation, to remove substantially all the $H_2S$ from the gas simultaneously with substantially all of the ammonia. It is also possible to recover ferrous salts suitable for reuse in the process from the precipitated ferrous sulphide, in which case ammonia and $H_2S$ gases are separately produced as such.

In order that my invention may be more readily understood, I now describe with reference to the accompanying drawing a preferred method of practicing my improved process of purifying gas and recovering products therefrom with the aid of spent pickling liquor or other iron salt solutions.

In the drawing:

The single figure is a somewhat diagrammatic view, partly in elevation and partly in vertical section of apparatus suitable for use in the practice of my invention.

Coke oven gas or the like which is preferably substantially free from tar and which may or may not contain ammonia still vapors but usually contains some ammonia, $H_2S$, and HCN, enters a cyanogen scrubber 1 through a pipe 2. In this scrubber, the gas is intimately contacted with an absorbent for HCN and the like which may, for example, be an aqueous suspension of sulphur. This absorbent is recirculated over the scrubber as described in the copending application of F. W. Sperr, Jr., and H. A. Gollmar, Serial No. 506,378, filed January 3, 1931, (Case No. 409), for example, and absorbs cyanogen compounds and usually a relatively small amount of ammonia and $H_2S$ to form ammonium thiocyanate in solution.

This thiocyanate solution may be withdrawn through a pipe 4 and sold as such, or it may be concentrated or otherwise treated for recovery of the ammonium thiocyanate. Fresh absorbent, such as make-up water and/or sulphur suspension, is supplied through a pipe 5 to the pump 6 which recirculates absorbent over the scrubber.

Gas substantially free from cyanogen compounds passes from the scrubber 1 through a pipe 8, and is then contacted with iron pickling liquor or some other neutral or acid iron salt solution in an absorber 10. This absorber may be of any suitable type, but is preferably so designed that intimate contact between the gas and the solution is insured.

In the absorber, ammonia in the gas neutralizes free acid in the liquor, and then ammonia and $H_2S$ in the gas react with ferrous sulphate in the pickling liquor to form ammonium sulphate in solution and to precipitate ferrous sulphide, FeS, according to the equation:

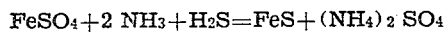
$$FeSO_4 + 2 NH_3 + H_2S = FeS + (NH_4)_2 SO_4$$

If there is not sufficient hydrogen sulphide in the gas for complete removal of the ammonia, the remaining ammonia may be largely removed with formation of ferrous carbonate according to the equation:

$$FeSO_4 + 2NH_3 + CO_2 + H_2O = FeCO_3 + (NH_4)_2 SO_4$$

This reaction, however, is not as suitable for complete removal of ammonia as the preceding one.

If substantially complete recovery of ammonia in the form of ammonium sulphate free from iron is desired, and the original ratio of sulphur to ammonia in the gas is too low to allow this to be accomplished by the first reaction above, it is preferable to limit ferrous carbonate formation. This may be done by adding hydrogen sulphide, sulphuric acid, ammonium bisulphate, or the like, to the gas or to the iron solution as described hereinbelow, or by so regulating the amount of iron solution contacted with the gas that only an amount of ammonia equivalent to the amount of $H_2S$ present is removed by the iron solution, and then completing the removal of ammonia in a separate saturator supplied with sulphuric acid, ammonium bisulphate or the like.

When this second alternative is employed, gas passes from the absorber 10 through a solution separator 12 and pipes 13 and 14 into a saturator 15 of the usual type. In this saturator, removal of ammonia from the gas is completed and the gas passes on through pipe 17 for further purification or other disposal. When removal of ammonia is substantially complete in the absorber 10, gas passes from pipe 13 directly through pipe 19 for further purification or other disposal.

Spent pickling liquor or some other suitable solution of ferrous sulphate or the like is supplied to the absorber 10 through pipes 21 and 22, and sulphuric acid is normally supplied to the saturator 15, when that saturator is in use, through a pipe 24. As stated hereinabove, if it is desired to supplement the normal acidity of the pickling liquor, sulphuric acid may be added to it, as through a pipe 25 connecting pipes 24 and 21.

After the iron is substantially completely precipitated, slurry consisting essentially of a suspension of ferrous sulphide and/or ferrous carbonate in a solution of ammonium sulphate is withdrawn from the absorber 10 by a pump 26 and delivered through a pipe 28 to a filter 30, which is preferably of the continuous type. This filter removes the iron sulphide and analogous precipitates from the solution.

The clear filtrate, consisting essentially of ammonium sulphate solution with possibly a trace of dissolved iron salts, such as ferrous sulphate, and the wash water supplied through a pipe 32 for washing the filter cake, is withdrawn from the filter by a pump 34 and delivered through pipe 35 to an evaporator 36.

This evaporator may be of any suitable type, but is preferably a multiple effect crystallizing evaporator. When the solution has been concentrated in the evaporator to the crystallizing point, it is withdrawn through a pipe 38 and cooled, or the ammonium sulphate is crystallized in the evaporator itself. The slurry of ammonium sulphate crystals is then delivered through a pipe 39 to a centrifuge 40 or other suitable device by means of which the ammonium sulphate is recovered in crystalline form from the mother liquor. The mother liquor may be returned to the evaporator, or otherwise disposed of.

Alternatively, the solution may be partially concentrated and then delivered through pipes 38, 42, 43 and 24 into the saturator 15, where concentration is completed by the gas and the ammonium sulphate crystals are then recovered in the ordinary manner with the sulphate normally produced in this saturator.

As a further alternative, concentration in the evaporator 36 may be omitted entirely and the ammonium sulphate solution withdrawn from the filter 30 may be returned directly to the saturator 15 through pipes 35, 45 and 24. When part or all of the concentration is effected in the saturator 15, the gas entering the saturator must be sufficiently preheated to provide for evaporation of the desired amount of water, or strong acid must be supplied to the saturator.

The iron sulphide precipitate removed by the filter 30 may be wasted, or roasted to form iron oxide pigment, or used in certain gas purification processes, or it may be dissolved in acid or acid salt solutions to give off pure hydrogen sulphide. For example, some of the iron sulphide may be delivered through a hopper 47 and a pipe or passage 48 into a reaction vessel 50, in which it is treated with acid or acid salt solution supplied through a pipe 52.

Hydrogen sulphide is thereby liberated and passes from the vessel 50 through a pipe 54. This $H_2S$ may be compressed or liquefied and sold as such, or it may be wasted, or converted to sulphur or sulphur dioxide by known methods. Part of it may be returned from pipe 54 through pipe 56 to pipe 8, where sufficient $H_2S$ is mixed with gas entering the absorber 10 to adjust the ratio of $H_2S$ to ammonia in the gas so that it is possible to substantially completely remove ammonia from the gas in the absorber simultaneously with removal of the $H_2S$, according to the reaction described hereinabove. For example, if a substantially neutral solution of iron salts is used, the molar ratio of $H_2S$ to ammonia should be approximately $\frac{1}{2}$.

If it is desired to convert part or all of the $H_2S$ to sulphur, this may be done, for example, by passing the gas from pipe 58 into an absorber 60, wherein $H_2S$ is absorbed by an alkaline liquid containing a suitable catalyst or purifying agent, such as an iron compound, or a compound of arsenic, nickel or other suitable element known to the art. The solution is thereby fouled or sulphided, and is withdrawn from the bottom of the absorber 60 by a pump 61 and delivered to an actifier 62 which may be of any suitable type, such as the pressure thionizer shown in the present instance, for example.

The fouled solution passes upwardly through the thionizer 62 concurrently with air supplied through a pipe 64, and is actified. Sulphur is thereby liberated in the form of a froth which separates from the solution in a separating chamber 66 at the top of the thionizer and overflows through pipe 67 to a sulphur slurry tank 68. The actified solution returns from the thionizer 62 through a pipe 70 into the absorber 60, where it absorbs a further quantity of H₂S.

The slurry may be withdrawn from tank 68, as by a pump 72, and delivered through a pipe 73 for purification of the sulphur, or for other treatment or disposal. Part or all of the sulphur, as needed, may be delivered from pipe 73 through pipe 75 to pipe 5, through which it enters the cyanogen scrubber 1 where it assists in the removal of HCN from a further quantity of gas in the form of ammonium thiocyanate as described hereinabove.

The acid or acid salt supplied to the reaction vessel 50 through pipe 52 reacts with the iron sulphide to form iron salts as well as the H₂S. These iron salts, which are usually in solution, may be withdrawn through a pipe 77 and wasted, or part or all of this solution may be delivered by a pump 78 or other suitable delivery means through a pipe 80 and pipes 21 and 22 into the absorber 10, where it replaces part or all of the iron salt solution from other sources otherwise required for the removal of ammonia and H₂S from a further quantity of gas.

The ammonium sulphate recovered from the concentrated solution by the centrifuge 40 may be sold as such or part or all of it may be delivered through a hopper 82 and a pipe 83, or other suitable means, into an autoclave 85, or some other suitable heating vessel. In this vessel, the salt is heated, as by a gas burner 86, preferably out of contact with combustion gases, and is thereby decomposed into ammonia and ammonium bisulphate.

The ammonia passes in gaseous form from the vessel 85 through a pipe 88, and may be liquefied and sold as such, or made into pure ammonia liquor, or otherwise disposed of. Part or all of it may pass through pipe 89 into pipe 8 where it is mixed with a further quantity of coke oven gas or other fuel gas to make up for any deficiency of ammonia therein, and to thereby provide for substantially complete removal of H₂S from the gas. Part of the ammonia may also be passed from pipe 89 through pipe 90 into pipe 22, where it partially ammoniates the pickling liquor, or other iron salt solution entering the absorber 10.

Ammonium bisulphate may be dissolved in the vessel 85 in water supplied through a pipe 92, or it may be withdrawn from this vessel and subsequently dissolved in water to form bisulphate solution which is then disposed of in any suitable manner. The bisulphate solution, or molten bisulphate may be delivered by a pump 94 through pipe 95 into pipe 43 through which it returns to the saturator 15 where it is employed in the removal of ammonia from a further quantity of gas, or it may pass from pipe 95 through pipe 52 into the reaction vessel 50 wherein it reacts with ferrous sulphide to produce H₂S and iron salt solution as described.

As a further alternative, it may be delivered through pipe 97 into pipe 80, from which it passes into the absorber 10 with or without a further quantity of iron salt solution, and assists in the absorption of a further quantity of ammonia and H₂S, as described hereinabove.

My invention thus utilizes iron salts such as those contained in iron pickling liquor, for example, in the removal of sulphur and ammonia from fuel gas in a manner which can be readily adapted to various ratios of sulphur to ammonia in the gas, and to various relative market values of the different ammonia products, acid, and iron salts. The process is adapted for use continuously or as a batch process.

It will be obvious to those skilled in the art that certain modifications can be made in the several steps of my process and the several parts of my apparatus other than those referred to hereinabove without departing from the spirit of my invention, and it is my intention to cover in the claims such modifications as are reasonably included within the scope thereof.

I claim as my invention:

1. The process of purifying fuel gas which comprises contacting said gas with an aqueous liquid containing suspended sulphur to remove HCN from the gas, then contacting the gas with an iron salt solution which absorbs ammonia and H₂S to form ammonium salt in solution and to precipitate iron sulphide, removing iron sulphide from the solution, treating removed iron sulphide with acidic material to liberate H₂S, converting liberated H₂S into free sulphur, adding free sulphur so obtained to an aqueous liquid in which it forms a suspension, and contacting said suspension with a further quantity of fuel gas to remove HCN therefrom.

2. The process of purifying fuel gas which comprises contacting said gas with an aqueous liquid containing suspended sulphur to remove HCN from the gas, then contacting the gas with an iron salt solution which absorbs ammonia and H₂S to form ammonium salt in solution and to precipitate iron sulphide, removing iron sulphide from the solution, recovering ammonium salt from the solution, decomposing recovered ammonium salt into ammonia and an acid compound, treating removed iron sulphide with said acid compound to liberate H₂S, converting H₂S to free sulphur and employing said free sulphur in the removal of HCN from a further quantity of fuel gas.

3. The process of purifying fuel gas which comprises scrubbing said gas with an aqueous suspension of sulphur to substantially completely remove HCN therefrom, contacting the gas with a solution containing iron sulphate which absorbs ammonia and substantially all of the H₂S contained in said gas to form ammonium sulphate in the solution and to substantially completely precipitate iron from the solution in the form of iron sulphide, separating precipitated iron sulphide from the solution, concentrating the solution and recovering crystalline ammonium sulphate therefrom, heating recovered ammonium sulphate to liberate ammonia and to form ammonium bisulphate, treating precipitated iron sulphide with said ammonium bisulphate to liberate H₂S and to form an iron salt solution, contacting said iron salt solution with a further quantity of fuel gas to remove ammonia and H₂S into free sulphur, and employing free sulphur so produced in the removal of HCN from a further quantity of gas.

CALEB DAVIES, Jr.